US012649563B2

(12) United States Patent  (10) Patent No.: US 12,649,563 B2

Inoue et al.  (45) Date of Patent: Jun. 9, 2026

(54) SYSTEM FOR AND METHOD OF CONTROLLING WATERCRAFT

(71) Applicant: YAMAHA HATSUDOKI KABUSHIKI KAISHA, Iwata (JP)

(72) Inventors: Hiroshi Inoue, Shizuoka (JP); Daisuke Okamura, Shizuoka (JP); Katsutoshi Naito, Shizuoka (JP); Kunihiko Akahane, Shizuoka (JP); Hiroaki Takase, Shizuoka (JP); Kazumichi Yoshida, Shizuoka (JP); Tomohiro Hirota, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 19/066,237

(22) Filed: Feb. 28, 2025

(65) Prior Publication Data

US 2025/0333154 A1  Oct. 30, 2025

(30) Foreign Application Priority Data

Apr. 25, 2024  (JP) ................................. 2024-071402

(51) Int. Cl.
B63H 25/04 (2006.01)
G05D 1/248 (2024.01)
(Continued)

(52) U.S. Cl.
CPC ............. B63H 25/04 (2013.01); G05D 1/248 (2024.01); G05D 1/646 (2024.01);
(Continued)

(58) Field of Classification Search
None
See application file for complete search history.

(56) References Cited

U.S. PATENT DOCUMENTS

2022/0106029 A1  4/2022  Itou
2024/0109627 A1*  4/2024  Hashizume ............. B63B 21/00

FOREIGN PATENT DOCUMENTS

CN  110610134 A  12/2019
DE  102023124703 A1  4/2024
JP  2022060044 A  4/2022

OTHER PUBLICATIONS

Official Communication issued in corresponding European Patent Application No. 25156495.1, mailed on Nov. 24, 2025, 5 pages.
(Continued)

*Primary Examiner* — Peter D Nolan
*Assistant Examiner* — Michael F Whalen
(74) *Attorney, Agent, or Firm* — Keating & Bennett, LLP

(57) ABSTRACT

A system for controlling a watercraft includes a satellite positioning sensor, a remote sensor, and a controller. The satellite positioning sensor detects a position of a watercraft based on radio waves transmitted from a satellite. The remote sensor detects a position of a target object. When the satellite positioning sensor receives the radio waves transmitted from the satellite, the controller is configured or programmed to obtain the position of the watercraft detected by the satellite positioning sensor and execute a normal automated navigation such that the watercraft is moved along a predetermined navigation route. The controller is configured or programmed to obtain the position of the target object detected by the remote sensor during navigation of the watercraft, and execute a temporary automated navigation to move the watercraft toward the target object when the satellite positioning sensor is interrupted from receiving the radio waves transmitted from the satellite.

14 Claims, 7 Drawing Sheets

(51) Int. Cl.
    G05D 1/646       (2024.01)
    *G05D 109/30*     (2024.01)
    *G05D 111/10*     (2024.01)

(52) U.S. Cl.
    CPC ... *B63H 2025/045* (2013.01); *G05D 2109/34*
            (2024.01); *G05D 2111/10* (2024.01)

(56)            References Cited

OTHER PUBLICATIONS

Official Communication issued in corresponding European Patent
Application No. 25156495.1, mailed on Jul. 30, 2025, 9 pages.

\* cited by examiner

X2

A1

SYSTEM FOR AND METHOD OF CONTROLLING WATERCRAFT

CROSS REFERENCE TO RELATED APPLICATIONS

This application claims the benefit of priority to Japanese Patent Application No. 2024-071402 filed on Apr. 25, 2024. The entire contents of this application are hereby incorporated herein by reference.

BACKGROUND OF THE INVENTION

1. Field of the Invention

The present invention relates to systems for and methods of controlling watercraft.

2. Description of the Related Art

There has been conventionally known an automated navigation technology for causing a watercraft to automatically move along a predetermined navigation route. For example, in such an automated navigation technology as described in Japan Laid-open Patent Application Publication No. 2022-060044, the watercraft includes a satellite positioning sensor for a satellite positioning system such as the GPS (Global Positioning System). The satellite positioning sensor detects the position of the watercraft based on radio waves transmitted from a satellite. A controller for the watercraft causes the watercraft to automatically move along a predetermined navigation route based on the position of the watercraft detected by the satellite positioning sensor.

When the watercraft passes under a building structure such as a bridge, for instance, chances are that the radio waves transmitted from the satellite become temporarily unreceivable by the satellite positioning sensor. In this case, it is difficult to continue the automated navigation for the watercraft by the technology described above.

SUMMARY OF THE INVENTION

Example embodiments of the present invention enable watercraft to continue automated navigation even when radio waves transmitted from a satellite become temporarily unreceivable by a satellite positioning sensor.

A system according to an example embodiment of the present invention relates to a system for controlling a watercraft. The system includes a satellite positioning sensor, a remote sensor, and a controller. The satellite positioning sensor is located in or on the watercraft and detects a position of the watercraft based on radio waves transmitted from a satellite. The remote sensor is located in or on the watercraft and detects a position of a target object that is located in a moving direction of the watercraft. The controller is configured or programmed to obtain the position of the watercraft detected by the satellite positioning sensor and execute a normal automated navigation based on the position of the watercraft such that the watercraft is moved along a predetermined navigation route when the satellite positioning sensor receives the radio waves transmitted from the satellite. The controller is configured or programmed to obtain the position of the target object detected by the remote sensor during navigation of the watercraft, and execute a temporary automated navigation such that the watercraft is controlled to move toward the target object when the satellite positioning sensor is interrupted from receiving the radio waves transmitted from the satellite.

A method according to another example embodiment of the present invention relates to a method of controlling a watercraft. The watercraft includes a satellite positioning sensor and a remote sensor. The satellite positioning sensor detects a position of the watercraft based on radio waves transmitted from a satellite. The remote sensor detects a position of a target object that is located in a moving direction of the watercraft. The method includes obtaining the position of the watercraft detected by the satellite positioning sensor, executing a normal automated navigation based on the position of the watercraft detected by the satellite positioning sensor such that the watercraft is moved along a predetermined navigation route when the satellite positioning sensor receives the radio waves transmitted from the satellite, obtaining the position of the target object detected by the remote sensor during navigation of the watercraft, and executing a temporary automated navigation such that the watercraft is controlled to move toward the target object when the satellite positioning sensor is interrupted from receiving the radio waves transmitted from the satellite.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
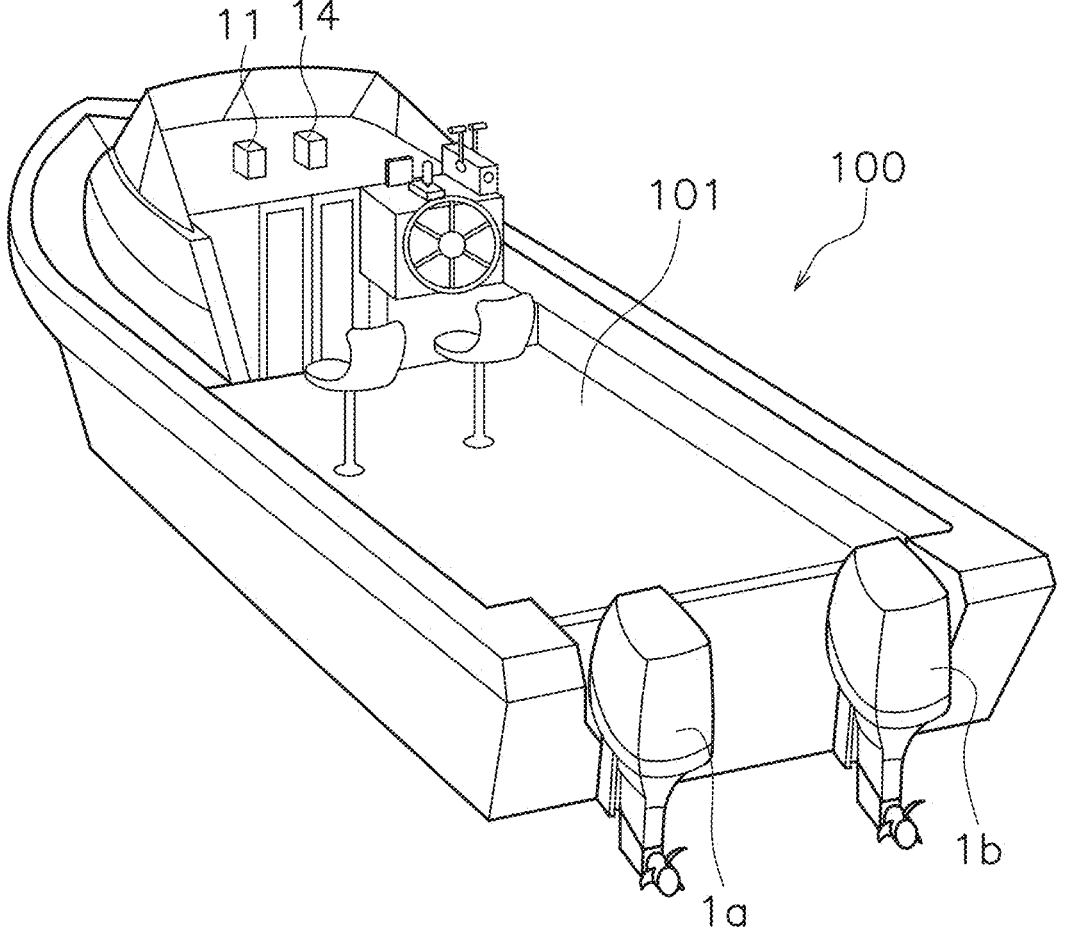
FIG. 1 is a perspective view of a watercraft including a system according to an example embodiment of the present invention.

Systems and methods for controlling watercraft according to example embodiments of the present invention will be hereinafter explained with reference to drawings. FIG. 1 is a perspective view of a watercraft 101 including a system 100 according to an example embodiment. The system 100 causes the watercraft 101 to automatically navigate in an unmanned manner. The system 100 includes a first marine propulsion device 1a and a second marine propulsion device 1b. The first and second marine propulsion devices 1a and 1b are, for example, outboard motors. The first and second marine propulsion devices 1a and 1b each generate a thrust to propel the watercraft 101.

Figure 2:
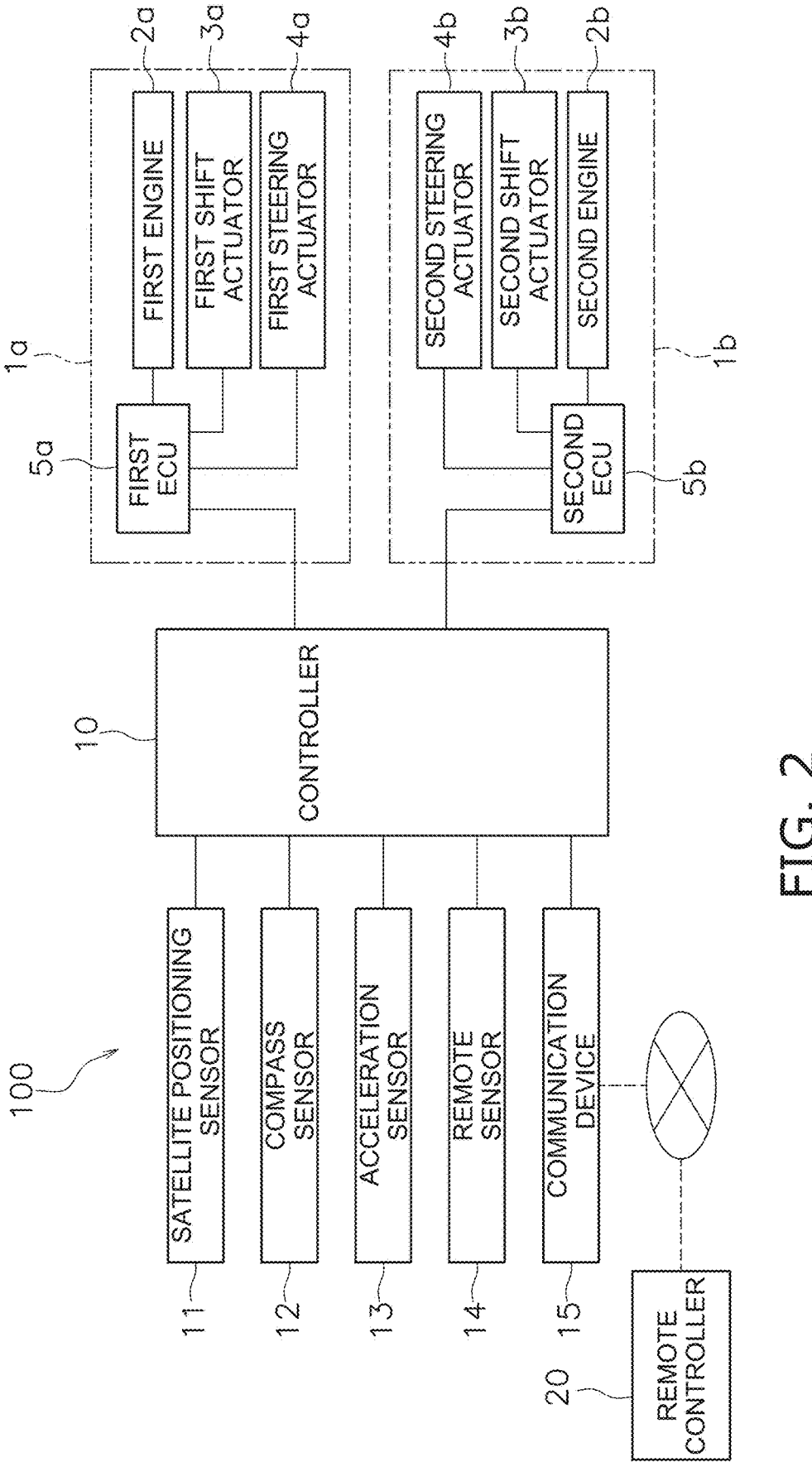
FIG. 2 is a block diagram showing a configuration of the system.

FIG. 2 is a block diagram showing a configuration of the system 100. As shown in FIG. 2, the first marine propulsion device 1a includes a first engine 2a, a first shift actuator 3a, a first steering actuator 4a, and a first ECU (Electronic Control Unit) 5a. The first engine 2a generates a thrust to propel the watercraft 101.

The first shift actuator 3a includes, for instance, an electric motor. The first shift actuator 3a changes the states of clutch engagement in the first marine propulsion device 1a to change the rotational directions of a propeller in the first marine propulsion device 1a. Accordingly, the actions of the watercraft 101 are shifted between forward movement and rearward movement. The first steering actuator 4a includes, for instance, an electric motor. The first steering actuator 4a turns the first marine propulsion device 1a right and left. Accordingly, the first marine propulsion device 1a is changed in rudder angle.

The first ECU 5a includes a processor such as a CPU (Central Processing Unit) and memories such as a RAM (Random Access Memory) and a ROM (Read Only Memory). The first ECU 5a has stored therein programs and data to control the first marine propulsion device 1a. The first ECU 5a controls the first engine 2a.

The second marine propulsion device 1b includes a second engine 2b, a second shift actuator 3b, a second steering actuator 4b, and a second ECU 5b. The second engine 2b, the second shift actuator 3b, the second steering actuator 4b, and the second ECU 5b in the second marine propulsion device 1b are configured in comparable manner to the first engine 2a, the first shift actuator 3a, the first steering actuator 4a, and the first ECU 5a in the first marine propulsion device 1a, respectively.

The system 100 includes a satellite positioning sensor 11, a compass sensor 12, an acceleration sensor 13, and a remote sensor 14. The satellite positioning sensor 11 detects the position of the watercraft 101 based on radio waves transmitted from a satellite of a satellite positioning system. The satellite positioning sensor 11 includes, for instance, a receiver for a GNSS (Global Navigation Satellite System) such as the GPS (Global Positioning System). However, the satellite positioning sensor 11 may be a sensor other than the GNSS receiver. The satellite positioning sensor 11 outputs a signal indicating the position of the watercraft 101.

The compass sensor 12 detects the heading of the watercraft 101. The compass sensor 12 outputs a signal indicating the heading of the watercraft 101. The acceleration sensor 13 detects the acceleration of the watercraft 101. The acceleration sensor 13 outputs a signal indicating the acceleration of the watercraft 101. The remote sensor 14 detects the position of a target object located in the moving direction of the watercraft 101 with respect to the watercraft 101. The remote sensor 14 includes a camera, for instance, and obtains an image in the moving direction of the watercraft 101. The remote sensor 14 outputs a signal indicating the image in the moving direction of the watercraft 101.

The system 100 includes a controller 10. The controller 10 includes a processor such as a CPU and memories such as a RAM and a ROM. The controller 10 has stored therein programs and data to control the first and second marine propulsion devices 1a and 1b. The controller 10 is connected to the first and second ECUs 5a and 5b by wired or wireless communication.

The controller 10 outputs a command signal to each of the first and second ECUs 5a and 5b. The command signal is transmitted to the first engine 2a, the first shift actuator 3a, and the first steering actuator 4a through the first ECU 5a. The command signal is transmitted to the second engine 2b, the second shift actuator 3b, and the second steering actuator 4b through the second ECU 5b.

The controller 10 controls the first and second shift actuators 3a and 3b to shift the actions of the watercraft 101 (forward movement, rearward movement, and stoppage) from one to another. The controller 10 controls the first and second engines 2a and 2b to control the velocity of the watercraft 101. The controller 10 controls the first and second steering actuators 4a and 4b to steer the watercraft 101 right and left.

The controller 10 is connected to the satellite positioning sensor 11, the compass sensor 12, the acceleration sensor 13, and the remote sensor 14 in a communicable manner. The controller 10 obtains the position of the watercraft 101 based on the signal transmitted thereto from the satellite positioning sensor 11. The controller 10 obtains the velocity of the watercraft 101 based on the signal transmitted thereto from the satellite positioning sensor 11. The controller 10 obtains the heading of the watercraft 101 based on the signal transmitted thereto from the compass sensor 12. The controller 10 obtains the acceleration of the watercraft 101 based on the signal transmitted thereto from the acceleration sensor 13. The controller 10 obtains the image in the moving direction of the watercraft 101 based on the signal transmitted thereto from the remote sensor 14.

Figure 3:
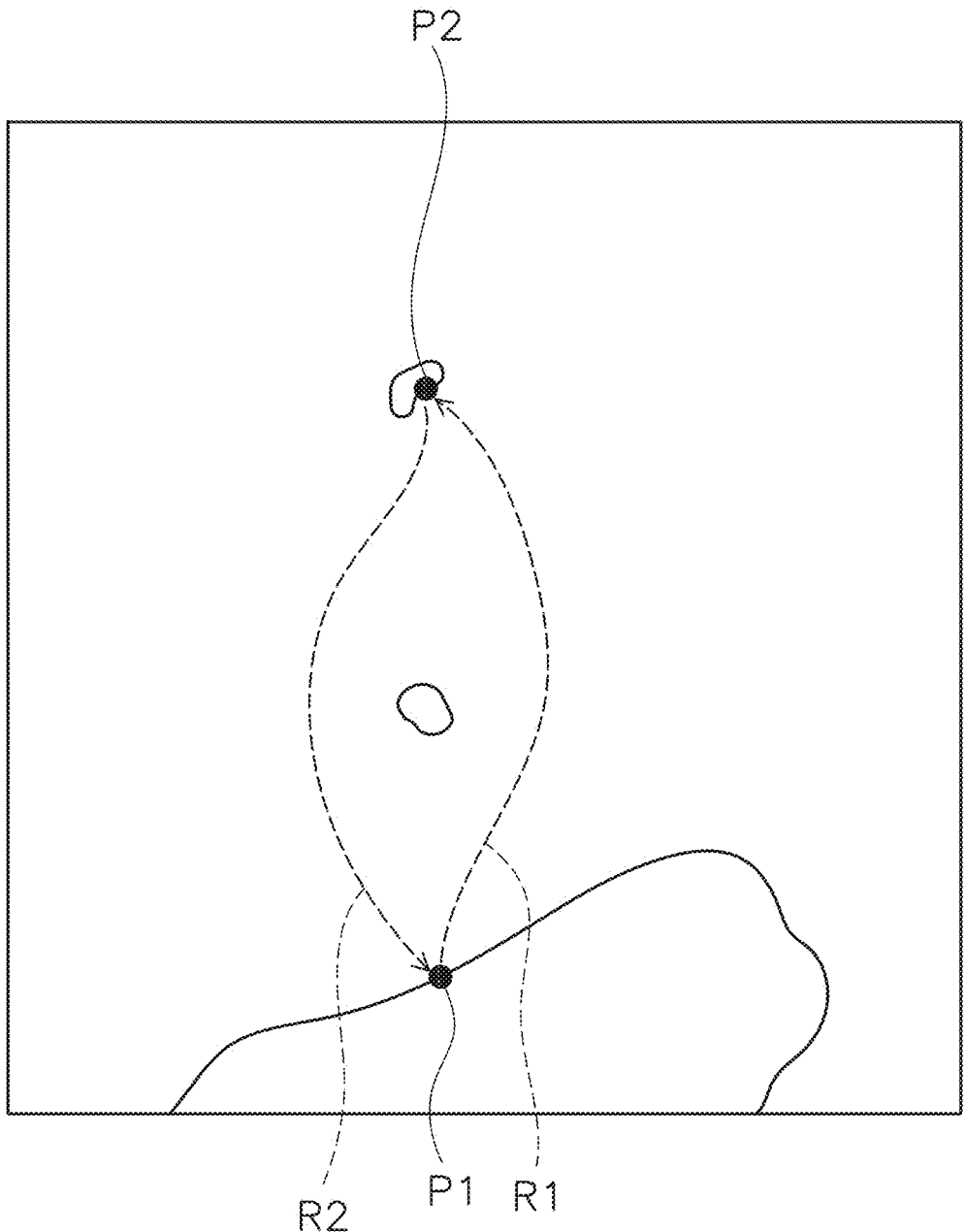
FIG. 3 is a diagram exemplifying navigation routes during automated navigation control.

As shown in FIG. 3, the controller 10 causes the watercraft 101 to automatically navigate between a departure point P1 to a destination point P2 in an unmanned manner. The controller 10 includes stored automated navigation information including the location of the departure point P1, the location of the destination point P2, and navigation routes R1 and R2 between the departure point P1 and the destination point P2. The controller 10 controls the watercraft 101 to move along the navigation route R1 from the departure point P1 to the destination point P2 based on the sensor information detected by the sensors described above and the automated navigation information. The controller 10 is configured or programmed to control the watercraft 101 to move along the navigation route R2 from the destination point P2 to the departure point P1 based on the sensor information and the automated navigation information.

It should be noted that as shown in FIG. 2, the system 100 includes a communication device 15. The communication device 15 executes data communication with a remote controller 20 over a mobile communication network. The remote controller 20 is disposed in, for instance, a management center remote from the watercraft 101. In the management center, an operator causes the remote controller 20 to transmit a command signal to the controller 10 of the watercraft 101 such that the watercraft 101 can be remotely operated.

Figure 4:
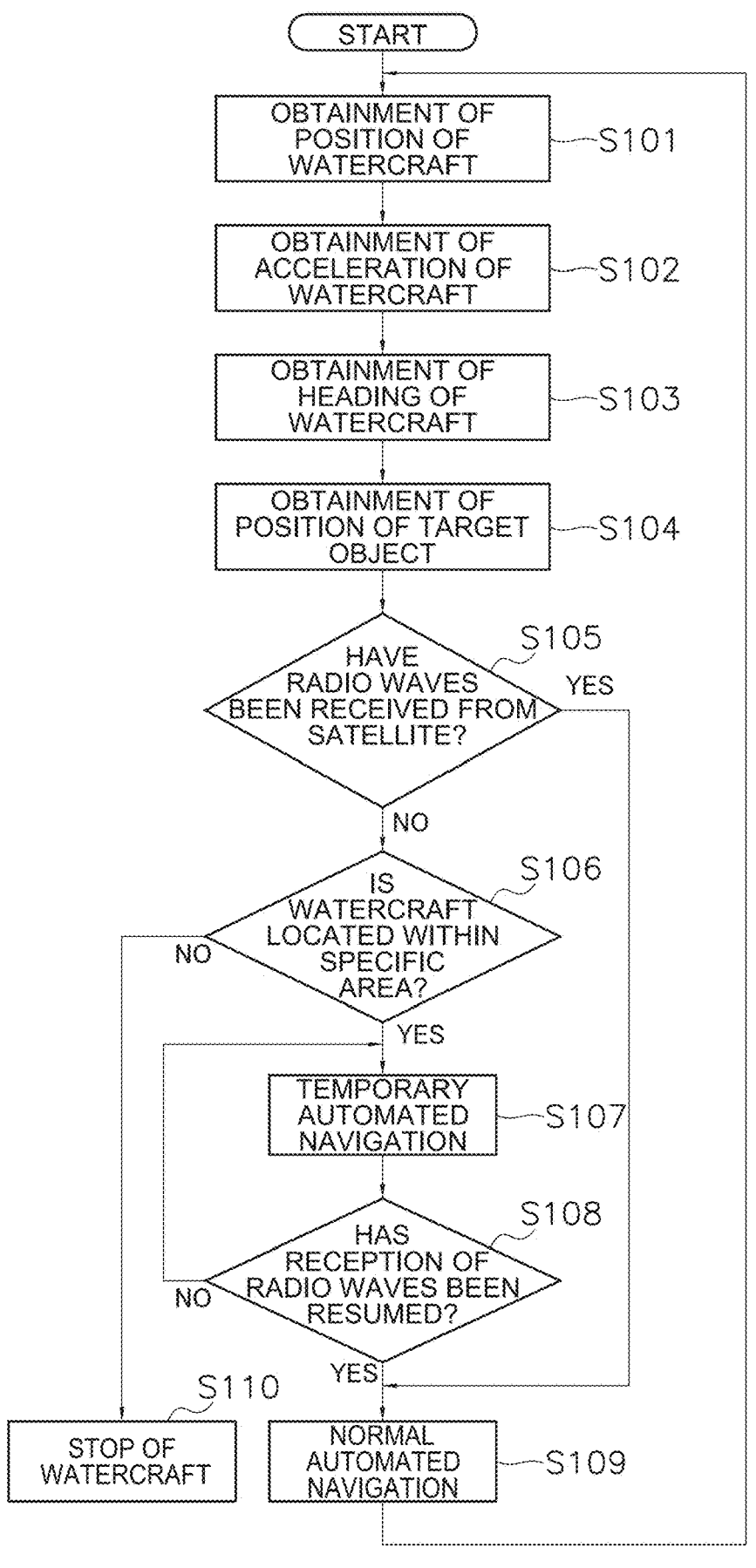
FIG. 4 is a flowchart showing a series of processes for the automated navigation control.

Next, the automated navigation control executed for the watercraft 101 by the controller 10 will be explained. FIG. 4 is a flowchart showing a series of processes of the automated navigation control executed for the watercraft 101 by the controller 10. As shown in FIG. 4, in step S101, the controller 10 obtains the position of the watercraft 101. The controller 10 obtains the position of the watercraft 101 based on a signal transmitted thereto from the satellite positioning sensor 11.

In step S102, the controller 10 obtains the acceleration of the watercraft 101. The controller 10 obtains the acceleration of the watercraft 101 based on a signal transmitted thereto from the acceleration sensor 13. In step S103, the controller 10 obtains the heading of the watercraft 101. The controller 10 obtains the heading of the watercraft 101 based on a signal transmitted thereto from the compass sensor 12.

Figure 5:
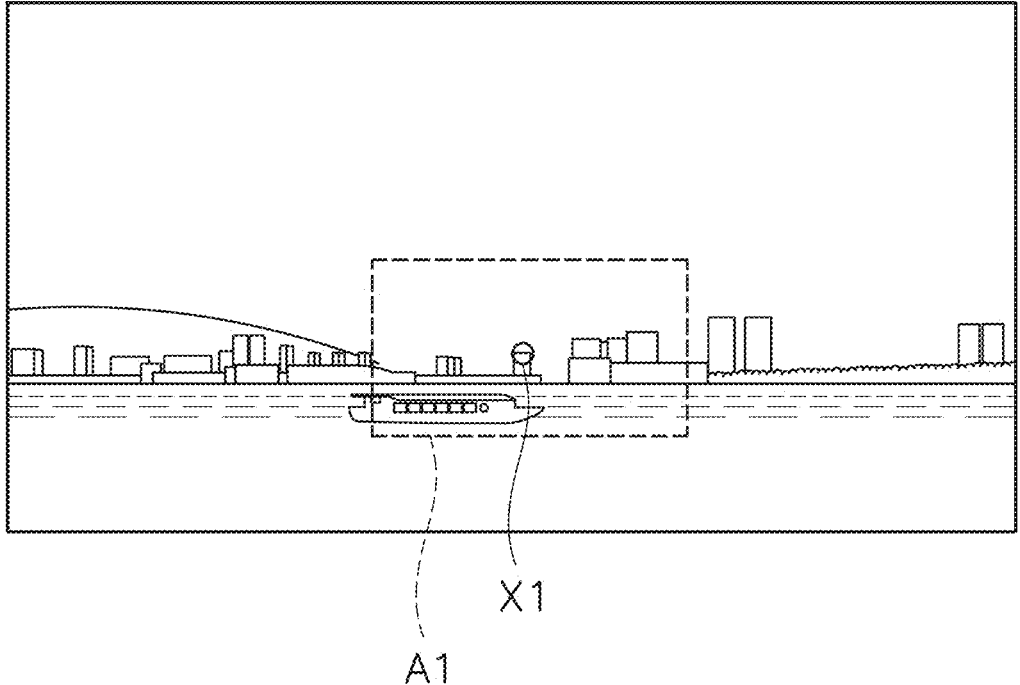
FIG. 5 is a diagram exemplifying a target object detected by a remote sensor.

In step S104, the controller 10 obtains the position of a target object. The controller 10 obtains the position of the target object located a predetermined distance ahead of the watercraft 101 in the moving direction of the watercraft 101 based on a signal transmitted thereto from the remote sensor 14. FIG. 5 is a diagram exemplifying an image detected in the moving direction of the watercraft 101 by the remote sensor 14. The controller 10 conducts an image analysis to detect an object standing still within a predetermined angle of view A1 of the camera as a target object X1.

The target object may be, for instance, a building on the ground. Alternatively, the target object may be a structure on the water surface. When a plurality of objects are detected, the controller 10 determines the one closest to the center of the angle of view A1 among the objects as the target object in priority to the others. During navigation of the watercraft 101, the controller 10 continuously detects an object located in the moving direction of the watercraft 101 as the target object and updates the position of the target object. Therefore, the target object is not constant and the controller 10 changes the target object in accordance with the movement of the watercraft 101.

In step S105, the controller 10 determines whether or not the satellite positioning sensor 11 is receiving the radio waves from the satellite. When the satellite positioning sensor 11 is receiving the radio waves from the satellite, the process proceeds to step S109. In step S109, the controller 10 controls the watercraft 101 by a normal automated navigation. In the normal automated navigation, the controller 10 causes the watercraft 101 to move along the navigation route R1, R2 based on the position of the watercraft 101 detected by the satellite positioning sensor 11.

Figure 6:
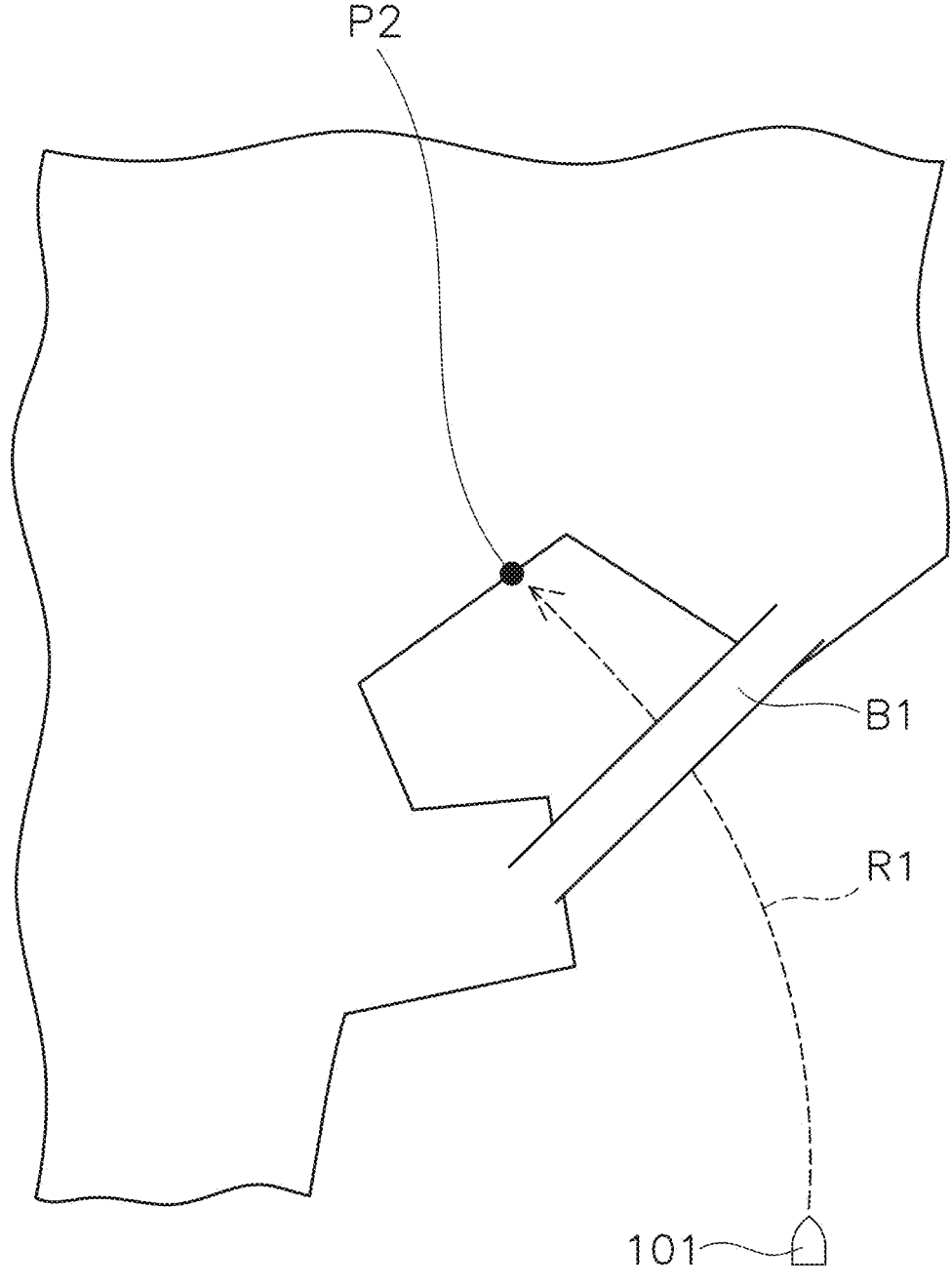
FIG. 6 is a diagram exemplifying the navigation route during the automated navigation control.

When the controller 10 determines that the satellite positioning sensor 11 is not receiving the radio waves from the satellite in step S105, the process proceeds to step S106. In step S106, the controller 10 determines whether or not the watercraft 101 is located within a specific area. The controller 10 stores, as the specific area, an area in which the radio waves transmitted from the satellite are unreceivable. For example, as shown in FIG. 6, chances are that the watercraft 101 passes under a bridge B1. The area under the bridge B1 is such an area that the radio waves transmitted from the satellite are unlikely to be receivable. Because of this, the controller 10 stores the area under the bridge B1 as the specific area. When the controller 10 determines that the watercraft 101 is located within the specific area, the process proceeds to step S107.

Figure 7:
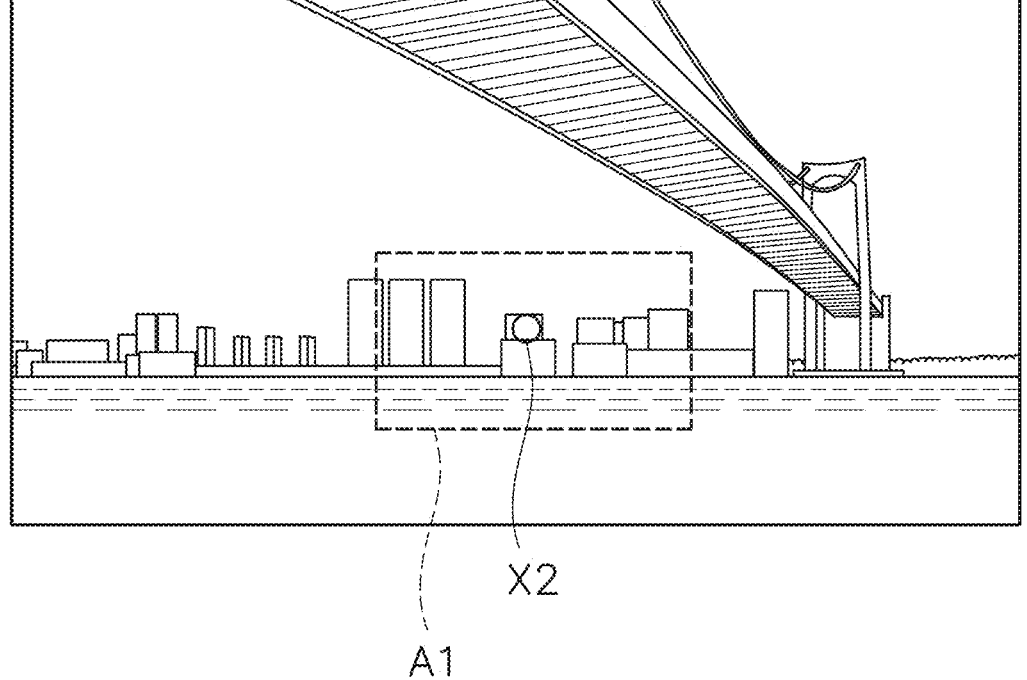
FIG. 7 is a diagram exemplifying the target object detected by the remote sensor.

In step S107, the controller 10 controls the watercraft 101 by a temporary automated navigation. In the temporary automated navigation, the controller 10 controls the watercraft 101 to move toward the target object. In other words, when the satellite positioning sensor 11 is interrupted from receiving the radio waves transmitted from the satellite, the controller 10 controls the watercraft 101 to move toward the target object that was set immediately before the interruption of receiving the radio waves. For example, as shown in FIG. 7, if the satellite positioning sensor 11 is interrupted from receiving the radio waves transmitted from the satellite when the watercraft 101 passes under the bridge, the controller 10 controls the watercraft 101 to move toward a target object X2 that was set immediately before the interruption of receiving the radio waves.

While the watercraft 101 is controlled by the temporary automated navigation, the controller 10 cannot obtain the position of the watercraft 101 by the satellite positioning sensor 11. Because of this, while the watercraft 101 is controlled by the temporary automated navigation, the controller 10 estimates the position of the watercraft 101 based on the heading of the watercraft 101 detected by the compass sensor 12 and the acceleration of the watercraft 101 detected by the acceleration sensor 13. The controller 10 controls the watercraft 101 to move toward the target object X2 based on the estimated position of the watercraft 101.

In step S108, the controller 10 determines whether or not the satellite positioning sensor 11 has resumed receiving the radio waves transmitted from the satellite. When the satellite positioning sensor 11 has not resumed receiving the radio waves transmitted from the satellite, the controller 10 continues the temporary automated navigation in step S107. When the satellite positioning sensor 11 has resumed receiving the radio waves transmitted from the satellite, the controller 10 restores the watercraft 101 to be controlled by the normal automated navigation in step S109. While the watercraft 101 is controlled by the automated navigation, the controller 10 repeatedly executes the series of processes from the steps S101 to S110 described above.

It should be noted that, when the satellite positioning sensor 11 is not receiving the radio waves transmitted from the satellite even though the watercraft 101 is not located within the specific area, the controller 10 stops the watercraft 101 in step S110. When the watercraft 101 is stopped, the controller 10 may inform the remote controller 20 of an alert. Accordingly, in the management center, the operator may remotely control the watercraft 101 through the remote controller 20.

In the system 100 according to the example embodiments explained above, when the satellite positioning sensor 11 is interrupted from receiving the radio waves transmitted from the satellite, the watercraft 101 is controlled to move toward the target object detected by the remote sensor 14. Accordingly, even when the satellite positioning sensor 11 is temporarily interrupted from receiving the radio waves transmitted from the satellite, the automated navigation can be continued for the watercraft 101.

Example embodiments of the present invention have been explained above. However, the present invention is not limited to the example embodiments described above, and a variety of changes can be made without departing from the gist of the present invention.

Each marine propulsion device is not limited to the outboard motor and may be changed. For example, each marine propulsion device may be an inboard engine outboard drive or alternatively a jet propulsion device. The number of marine propulsion devices is not limited to two. The number of marine propulsion devices may be one. Alternatively, the number of marine propulsion devices may be greater than two. The remote sensor 14 is not limited to the camera and may be another type of sensor such as a laser or radar.

The series of processes for the automated navigation control is not limited to that described above and may be changed. For example, the controller 10 may count a duration of time from interruption to resumption of receiving the radio waves transmitted from the satellite by the satellite positioning sensor 11. When the duration has become a threshold or greater, the controller 10 may stop the watercraft 101. The controller 10 may stop the watercraft 101 when the watercraft 101 has reached a location short of the target object by a predetermined distance until the satellite positioning sensor 11 resumes receiving the radio waves transmitted from the satellite after the satellite positioning sensor 11 has been interrupted from receiving the radio waves transmitted from the satellite.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:

a satellite positioning sensor in or on the watercraft and configured to detect a position of a watercraft based on radio waves transmitted from a satellite;

a remote sensor in or on the watercraft and configured to detect a position of a target object that is located in a moving direction of the watercraft; and a controller configured or programmed to:

obtain the position of the watercraft detected by the satellite positioning sensor and execute a normal automated navigation based on the position of the watercraft such that the watercraft is moved along a predetermined navigation route when the satellite positioning sensor receives the radio waves transmitted from the satellite;

obtain the position of the target object detected by the remote sensor during navigation of the watercraft; and execute a temporary automated navigation such that the watercraft is controlled to move toward the target object when the satellite positioning sensor is interrupted from receiving the radio waves transmitted from the satellite.

2. The system according to claim 1, wherein, while the satellite positioning sensor is receiving the radio waves transmitted from the satellite, the controller is configured or programmed to continuously detect a position of an object located a predetermined distance ahead of the watercraft in the moving direction of the watercraft and update the continuously detected position of the object as the position of the target object.

3. The system according to claim 1, wherein the controller is configured or programmed to:

determine whether or not the satellite positioning sensor has resumed receiving the radio waves transmitted from the satellite; and restore the watercraft to be controlled by the normal automated navigation when the satellite positioning sensor has resumed receiving the radio waves transmitted from the satellite.

4. The system according to claim 1, wherein the controller is configured or programmed to:

count a duration of time from interruption to resuming of receiving the radio waves transmitted from the satellite by the satellite positioning sensor; and stop the watercraft when the duration of time has become a threshold or greater.

5. The system according to claim 1, wherein the controller is configured or programmed to stop the watercraft when the watercraft has reached a location short of the target object by a predetermined distance until the satellite positioning sensor resumes receiving the radio waves transmitted from the satellite after the satellite positioning sensor has been interrupted from receiving the radio waves transmitted from the satellite.

6. The system according to claim 1, wherein the controller is configured or programmed to:

store an area in which the radio waves transmitted from the satellite are not receivable; and execute the temporary automated navigation when the watercraft has entered the area.

7. The system according to claim 1, wherein the watercraft is configured to navigate unmanned and automatically.

8. A method of controlling a watercraft including a satellite positioning sensor and a remote sensor, the satellite positioning sensor being configured to detect a position of the watercraft based on radio waves transmitted from a satellite, the remote sensor being configured to detect a position of a target object that is located in a moving direction of the watercraft, the method comprising:

obtaining the position of the watercraft detected by the satellite positioning sensor;

executing a normal automated navigation based on the position of the watercraft detected by the satellite positioning sensor such that the watercraft is moved along a predetermined navigation route when the satellite positioning sensor receives the radio waves transmitted from the satellite;

obtaining the position of the target object detected by the remote sensor during navigation of the watercraft; and executing a temporary automated navigation such that the watercraft is controlled to move toward the target object when the satellite positioning sensor is interrupted from receiving the radio waves transmitted from the satellite.

9. The method according to claim 8, further comprising:

continuously detecting a position of an object located a predetermined distance ahead of the watercraft in a moving direction of the watercraft, and updating the continuously detected position of the object as the position of the target object while the satellite positioning sensor is receiving the radio waves transmitted from the satellite.

10. The method according to claim 8, further comprising:

determining whether or not the satellite positioning sensor has resumed receiving the radio waves transmitted from the satellite; and restoring the watercraft to be controlled by the normal automated navigation when the satellite positioning sensor has resumed receiving the radio waves transmitted from the satellite.

11. The method according to claim 8, further comprising:

counting a duration of time from interruption to resuming of receiving the radio waves transmitted from the satellite by the satellite positioning sensor; and stopping the watercraft when the duration of time has become a threshold or greater.

12. The method according to claim 8, further comprising:

stopping the watercraft when the watercraft has reached a location short of the target object by a predetermined distance until the satellite positioning sensor resumes receiving the radio waves transmitted from the satellite after the satellite positioning sensor has been interrupted from receiving the radio waves transmitted from the satellite.

13. The method according to claim 8, further comprising:

determining whether or not the watercraft has entered an area in which the radio waves transmitted from the satellite are not receivable; and executing the temporary automated navigation when the watercraft has entered the area.

14. The method according to claim 8, wherein the watercraft is configured to navigate unmanned and automatically.

* * * * *